United States Patent Office 3,847,925
Patented Nov. 12, 1974

3,847,925
BENZENESULFONYL SEMICARBAZIDES
Laszlo Beregi, Boulogne, Pierre Hugon, Rueil-Malmaison, Pierre Desnoyers, Fontenay Aux Roses, and Jacques Duhault, Chatou, France, assignors to Societe en nom collectif "Science et Cie, Societe Francaise de Recherche Medicale, Suresnes, France
No Drawing. Filed June 29, 1972, Ser. No. 267,445
Claims priority, application Great Britain, July 15, 1971, 33,203/71
Int. Cl. C07d 29/34
U.S. Cl. 260—293.73       5 Claims

ABSTRACT OF THE DISCLOSURE

Benzenesulfonyl semicarbazides of the formula:

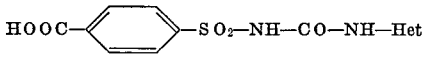

wherein Het is pyrrolidinyl, piperidinyl, methylpiperidinyl, dimethylpiperidinyl, 1,2,3,6 - tetrahydropyridyl, morpholinyl, 1-thiomorpholinyl or azacycloheptyl, each of them bonded to the —NH— group by its nitrogen atom.

These compounds possess microcirculation-improving and platelet-adhesiveness and -aggregation decreasing properties.

---

The present invention provides benzenesulfonyl semicarbazides of the general formula I:

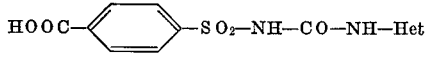

wherein Het is selected from the group consisting of: pyrrolidinyl, piperidinyl, methylpiperidinyl, dimethylpiperidinyl, 1,2,3,6 - tetrahydropyridyl, morpholinyl, 1-thiomorpholinyl and azacycloheptyl radicals, each of them bonded to the —NH— group by its nitrogen atom.

The present invention also provides addition salts of compounds of the formula I with suitable bases. Among the bases that may be used, there may be mentioned, for example, alkali metal hydroxides, amines, for example propylamine, butylamine, diethylamine or dipropylamine, and amino-alcohols, for example 1-amino-2-propanol, 2-amino-2-methyl-1-propanol or choline.

The compounds of the present invention are new and are prepared by reacting a compound of formula:

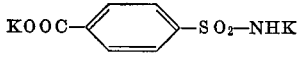

with a 4,4-diphenyl semicarbazide of the general formula II:

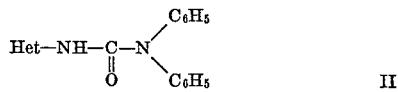

wherein Het has the meaning given above.

The 4,4-diphenyl semicarbazides of the formula II may be prepared, for example, by the method described by J. M. McManus and C. F. Gerber in J. of Med. Chem., 9 256 (1966) which comprises reacting an N-amino monocyclic heterocycle (Het—NH₂) with diphenyl carbamoyl chloride.

The N-amino monocyclic heterocycle may be prepared, for example, by the method described by J. B. Wright and R. E. Willette in J. Med. and Pharm. Chem., 5 819 (1962) which comprises nitrosating the corresponding monocyclic heterocycle and reducing the resulting N-nitroso derivative with lithium aluminium hydride.

The following Examples illustrate the present invention. All parts are by weight and melting points were determined on a Kofler block (K.), or on a Kofler heater under a microscope (M.K.).

EXAMPLE 1

1-para-carboxybenzenesulfonyl-3-(1-piperidinyl) urea

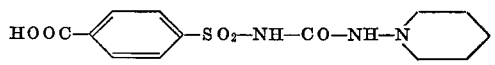

11.8 parts of 1,1-pentamethylene-4,4-diphenyl semicarbazide were added to 11.1 parts of the dipotassium salt of para-carboxybenzenesulfonamide suspended in a mixture of 120 ml. of dimethylformamide and 20 ml. of water. The mixture was heated on a steam-bath for 90 minutes and then concentrated in vacuo. The resulting crude product was extracted with 120 ml. of water and 100 ml. of ether. The aqueous layer was acidified to pH 3,5 with a normal aqueous solution of hydrochloric acid. The precipitate formed was filtered and air-dried. Recrystallization from 50 ml. of dimethylformamide and 50 ml. of water gave 7 parts of 1-para-carboxybenzenesulfonyl-3-(1-piperidinyl) urea, M.P. (K): 247–250° C. (M.K.) 199–200° C.

EXAMPLES 2 to 8

The following compounds were obtained according to the process described in Example 1.

2. 1-para-carboxybenzenesulfonyl - 3 - (azacyclohept-1-yl) urea, M.P. (K): 240–243° C., (M.K.) 195–197° C. (D.M.F./H₂O), starting from 1,1-hexamethylene-4,4-diphenyl semicarbazide and the dipotassium salt of para-carboxybenzenesulfonamide.
3. 1-para-carboxybenzenesulfonyl-3-(morpholin - 4 - yl) urea, M.P. (K) >260° C., (M.K.) 228–230° C. (D.M.F./H₂O), starting from 1,1-oxydiethylene-4,4-diphenyl semicarbazide and the dipotassium salt of para-carboxybenzenesulfonamide.
4. 1-para-carboxybenzenesulfonyl-3-(4 - methylpiperidin-1-yl) urea, M.P. (K) >260° C., (M.K.) 208–211° C. (D.M.F./H₂O), starting from 1,1 - (3 - methylpentamethylene)-4,4-diphenyl semicarbazide and the dipotassium salt of para-carboxybenzenesulfonamide.
5. 1-para-carboxybenzenesulfonyl - 3 - (1-thiomorpholin-4-yl) urea, M.P. (K) >260° C., (M.K.) 210–215° C. (D.M.F./H₂O), starting from 1,1-thiodiethylene-4,4-diphenyl semicarbazide and the dipotassium salt of para-carboxybenzenesulfonamide.
6. 1-para-carboxybenzenesulfonyl - 3 - (1,2,3,6-tetrahydro-1-pyridyl) urea, M.P. (K) 248–250° C., (M.K.) 194–197° C. (D.M.F./H₂O), starting from 1,1-(2-pentenylene)-4,4-diphenyl semicarbazide and the dipotassium salt of para-carboxybenzenesulfonamide.
7. 1-para-carboxybenzenesulfonyl - 3 - (2,6 - dimethylpiperidin-1-yl) urea, starting from 1,1-(1,5-dimethylpentamethylene) - 4,4 - diphenylsemicarbazide and the dipotassium salt of para-carboxybenzenesulfonamide.
8. 1-para-carboxybenzenesulfonyl - 3 - (1-pyrrolidinyl) urea, starting from 1,1-tetramethylene - 4,4 - diphenyl semicarbazide and the dipotassium salt of para-carboxybenzenesulfonamide.

The compounds of the present invention possess valuable pharmacological and therapeutic properties, especially microcirculation-improving and platelet-adhesiveness and -aggregation decreasing properties.

Their toxicity is very weak and the LD₅₀ studied in mice by the oral route is as low as 2 to >3 g./kg.

The activity on the microcirculation was evidenced by the method of French (Brit. J. Exp. Path. 45 467, 1964) on the mesocoecum of the rat. It was observed that the new compounds, administered at 10 to 50 mg./kg. P.O., delay the appearance and the evolution of the mural thrombus and decrease the formation of the platelet-thrombus on the wounded capillary wall.

An inhibition of the platelet stickiness was shown by the method of E. W. Salzmann (J. Lab. Clin. Med. 62, 724, 1923). Doses of 50 mg./kg. of the new compounds, administered perorally to the rabbit, decrease the platelet adhesiveness by up to 67%.

When tested by the photometric technic of Born and O'Brien, modified by Sikanos and Caen (Rev. Fr. E. Clin. Biol., 11, 538, 1966), an inhibition of 14 to 45% of the platelet-aggregation provoked by adenosine diphosphate in the rabbit's plasma, was observed with concentrations of 100 to 1000 γ/ml. of the new compounds.

It is to be noted that all the new compounds were tested for hypoglycemic activity and surprisingly, they were found to be devoid of any action on the blood sugar level.

The low toxicity and the hereabove described pharmacological properties enable the use of the new compounds in therapy, especially in the prevention and treatment of thromboembolic diseases and arteriosclerosis.

The present invention also provides pharmaceutical compositions containing a compound of general formula I or one of its physiologically tolerable salts, in admixture or conjunction with a suitable pharmaceutical carrier, such as for example, as distilled water, glucose, lactose, talc, starch, magnesium stearate or cocoa butter. These pharmaceutical compositions may be in form of tablets, dragées, capsules, suppositories or solutions, in order to be administered by oral, rectal or parenteral route at doses of from 50 to 500 mg., 1 to 5 times a day.

We claim:
1. A compound selected from the group consisting of:
(A) benzenesulfonyl semicarbazides of the formula:

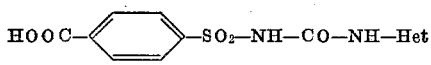

wherein Het is selected from the group consisting of pyrrolidinyl, piperidinyl, methylpiperidinyl, dimethylpiperidinyl, and azacycloheptyl each of them bonded to the —NH— group by its nitrogen atom; and (B) physiologically tolerable basic addition salts thereof.

2. A compound of claim 1 which is 1-para-carboxybenzenesulfonyl-3-(1-piperidinyl) urea.

3. A compound as defined in claim 1 wherein the compound is one in which —Het is piperidinyl, methylpiperidinyl, or dimethylpiperidinyl.

4. A compound as defined in claim 3 wherein —Het is 4-methylpiperidin-1-yl.

5. A compound as defined in claim 3 wherein —Het is 2,6-dimethylpiperidin-1-yl.

References Cited

UNITED STATES PATENTS 3,248,384  4/1966  Aumuller et al. ___ 260—293.73

OTHER REFERENCES

C.A. 75: 19943c (1971) Irikura et al.

NORMA S. MILESTONE, Primary Examiner

S. D. WINTERS, Assistant Examiner

U.S. Cl. X.R.

260—239 BF, 243 B, 247.1 R, 247.2 A, 293.77, 294.8 F, 326.23, 326.4, 515 M; 424—244, 246, 248, 263, 267, 274